United States Patent
Annic et al.

(10) Patent No.: US 7,823,188 B2
(45) Date of Patent: Oct. 26, 2010

(54) NETWORK ACCESS SYSTEM WHICH IS ADAPTED FOR THE USE OF A SIMPLIFIED SIGNATURE METHOD, AND SERVER USED TO IMPLEMENT SAME

(75) Inventors: Etienne Annic, Rambouillet (FR); Anne Boutroux, Hermanville sur Mer (FR); Cédric Goutard, Douvres la Delivrande (FR); Rym Sahnoun, Cachan (FR); Patrick Bauban, Caen (FR)

(73) Assignee: Orangefrance, Montrouge (FR)

( * ) Notice: Subject to any disclaimer, the term of this patent is extended or adjusted under 35 U.S.C. 154(b) by 1167 days.

(21) Appl. No.: 10/572,949

(22) PCT Filed: Sep. 7, 2004

(86) PCT No.: PCT/FR2004/002272
§ 371 (c)(1),
(2), (4) Date: May 2, 2006

(87) PCT Pub. No.: WO2005/034468
PCT Pub. Date: Apr. 14, 2005

(65) Prior Publication Data
US 2007/0056021 A1    Mar. 8, 2007

(30) Foreign Application Priority Data
Sep. 23, 2003   (FR)   ................... 03 11153

(51) Int. Cl.
G06F 17/30   (2006.01)
H04L 9/32    (2006.01)

(52) U.S. Cl. .......................................... 726/2; 713/168
(58) Field of Classification Search .................... 726/2, 726/9; 713/172; 380/229
See application file for complete search history.

(56) References Cited

U.S. PATENT DOCUMENTS 5,923,756 A * 7/1999 Shambroom ................. 713/156
6,317,838 B1   11/2001 Baize (Continued)

FOREIGN PATENT DOCUMENTS

WO   WO 01/80067   10/2001

OTHER PUBLICATIONS

"Liberty Architecture Overview, Version 1.1", Lierty Project, Jan. 15, 2003, XP002246163, Extrait de l'Internet:, URL:hhpt:// projectliberty.org/spec/archive/v1_1/liberty-architecture-overview-v1.1>'extrait le Jul. 2, 2003!, le document en entier.

*Primary Examiner*—Minh Dieu Nguyen
(74) *Attorney, Agent, or Firm*—Young & Thompson

(57) ABSTRACT

A system for accessing a packet-switching network (4), which is adapted for the use of a simplified signature method. The system includes a supplementary server (60) which is independent of a proxy server (50) of an access provider (12) and a simplified signature module (66) which is provided in the supplementary server (60). The proxy server (50) is equipped with an interface (64) which enables the connection of the proxy server to the supplementary server (60) and the transmission of at least the authentication requests sent by contacted service providers to the supplementary server (60) in order for the requests to be processed by the simplified signature module (66).

13 Claims, 4 Drawing Sheets

U.S. PATENT DOCUMENTS

| | | | |
|---|---|---|---|
| 7,219,134 B2 * | 5/2007 | Takeshima et al. | 709/217 |
| 7,234,158 B1 * | 6/2007 | Guo et al. | 726/2 |
| 7,240,192 B1 * | 7/2007 | Paya et al. | 713/152 |
| 7,320,024 B2 * | 1/2008 | Oku | 709/217 |
| 7,406,712 B2 * | 7/2008 | Kondo | 726/23 |
| 2002/0007460 A1 | 1/2002 | Azuma | |
| 2002/0188738 A1 * | 12/2002 | Gray | 709/229 |
| 2003/0004834 A1 * | 1/2003 | Yamazaki | 705/26 |
| 2003/0115142 A1 * | 6/2003 | Brickell et al. | 705/51 |
| 2003/0204610 A1 * | 10/2003 | Howard et al. | 709/229 |

* cited by examiner

NETWORK ACCESS SYSTEM WHICH IS ADAPTED FOR THE USE OF A SIMPLIFIED SIGNATURE METHOD, AND SERVER USED TO IMPLEMENT SAME

The invention relates to a system for access to a network suitable for implementing a simplified signature method, and a server used to implement the method.

More precisely, the invention relates to a system comprising:

at least one user station provided with an internet browser, a proxy server through which all the data flows pass which are exchanged between the or each user station and the network, a plurality of service providers which are connected to the network, each service provider being capable of transmitting an authentication request to the station of the user who contacts it in order to identify and/or authenticate this user before providing him with personalised and/or secure services, the response to be provided by the same user to this authentication request being able to be different in accordance with the service provider contacted, at least one authentication server which is capable of storing at least one item of authentication data for each user and transmitting, in response to an authentication request, an authentication response which contains an item of authentication data in accordance with both the service provider who transmitted the authentication request and the identity of the user who contacted this service provider, and a simplified signature module which is capable of automatically processing on behalf of the or each user station the authentication requests transmitted by the service providers contacted, this module being capable, for each user, of directing the authentication requests to the appropriate authentication server, and of transmitting to the service provider the corresponding authentication response transmitted by the appropriate authentication server.

These systems allow the implementation of a simplified signature method, more commonly known under the method name SSO ("Single Sign On" or "Simplified Sign On"). More detailed information relating to an example of an SSO method can be obtained by reading the recommendations defined by the business consortium referred to as Liberty Alliance, whose aim is to develop internet transactions. These recommendations may, for example, be obtained from the internet site http://www.projectliberty.org.

SSO methods are intended to simplify the identification and/or authentication of a user on the World Wide Web more commonly known as the WEB. In the remainder of this description, the World Wide Web will be referred to simply as the internet network.

SSO methods, and in particular those which conform to the recommendations of Liberty Alliance, implement the simplified signature module in the proxy server. However, this solution has the disadvantage that it involves significant modifications to existing proxy servers and provides an increase in the processing operations to be carried out by the existing proxy servers.

The object of the invention is to overcome this disadvantage by providing a system for access to a packet switching network suitable for implementing an SSO method in which the modifications to be carried out to the proxy server are minor and the consequences for the load to be processed are minor.

The invention therefore relates to a system as described above, characterised in that it comprises a supplementary server which is independent from the proxy server, the simplified signature module being implemented in this supplementary server, and in that the proxy server is provided with an interface which allows the supplementary server to be connected and allows at least the authentication requests transmitted by the service providers contacted to be transmitted to the supplementary server in order to process these requests using the simplified signature module.

According to other features of the system according to the invention, it is characterised in that:

the simplified signature module comprises a sub-module which is capable of identifying the user from his network address and adding an identifier of the user to the authentication requests directed to the authentication servers;

the at least one item of authentication data stored for each user comprises an item of data relating to a level of authentication available for this user, in that each authentication request transmitted by a service provider specifies features relating to the authentication level required by this service provider in order to be able to access the services it provides, in that the or each authentication server is capable of comparing the features relating to the required authentication level specified by the authentication request with the data relating to the authentication level available in order to determine whether the authentication level required corresponds to the authentication level available for this user, and in that the or each authentication server is capable of transmitting to the user an active authentication request which is capable of activating on the user station an interactive process for identification and/or authentication of the user if the authentication level required does not correspond to the authentication level available;

the supplementary server comprises a sub-module which is capable of directing the response of the user to the active authentication requests to the authentication server which has transmitted it;

the supplementary server comprises a sub-module which is capable of directing the active authentication request to the user station;

the simplified signature module comprises a sub-module which is capable of adding, to the requests transmitted by the user station to a service provider, a service identification signal having a simplified signature, in response to which the service provider transmits the authentication request;

the supplementary server and the proxy server are capable of communicating with each other using a Hyper Text Transfer Protocol (HTTP);

the Hyper Text Transfer Protocol is the iCAP protocol (Internet Content Adaptation Protocol) or the OCP protocol (OPES Call Out Protocol);

the supplementary server is capable of communicating with the service providers only by means of the Hyper Text Transfer Protocol used between it and the proxy server;

the supplementary server also implements an HTTP (Hyper Text Transfer Protocol) server and/or client in order to communicate directly with the or each service provider and/or the or each authentication server using only the HTTP protocol;

it comprises a provider of access to the network to which the or each user station must be connected in order to be able to access the network, this access provider being provided with the proxy server;

the network is the world wide web.

The invention will be better understood from a reading of the following description, given purely by way of example and with reference to the drawings, in which:

FIG. 1 illustrates a system, generally designated 2, for access to a packet switching network 4 which is suitable for implementing an SSO method in accordance with the recommendations defined by Liberty Alliance.

Figure 1:
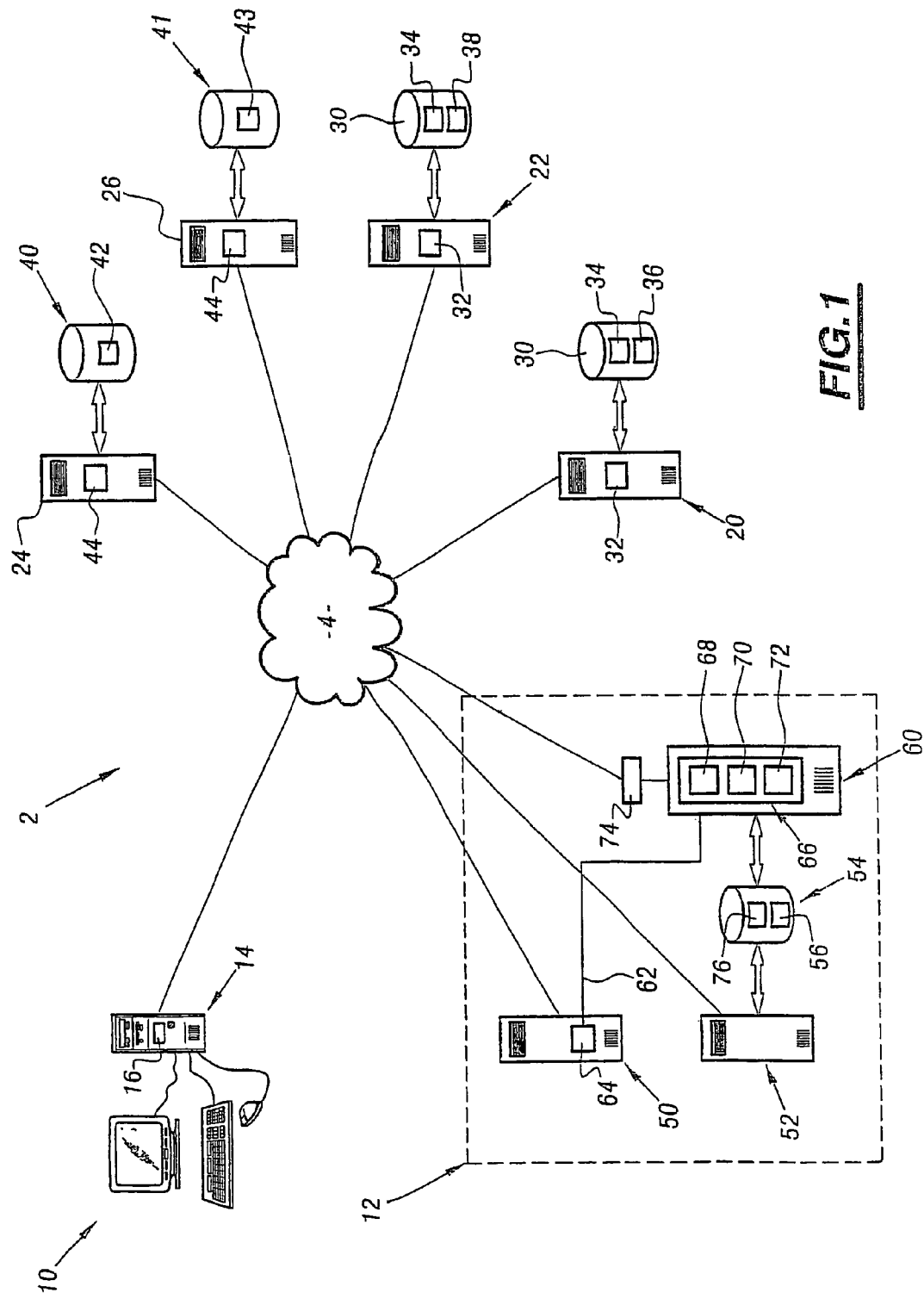
FIG. 1 is a schematic illustration of the architecture of a system according to the invention.

The recommendations set out by Liberty Alliance define the organisation and the functionalities of the various items of equipment or groups of equipment of the system 2 with sufficient precision for the person skilled in the art to be able to produce this equipment on reading these recommendations. These recommendations do not describe the detailed production of each of these items of equipment. Consequently, in the remainder of the description, only the block of equipment illustrated by a dashed rectangle in FIG. 1 will be described in detail, the other items of equipment of the system 2 being produced in conventional manner based on the recommendations of Liberty Alliance.

The system 2 will be described in this instance for the specific case in which the network 4 is the internet network.

The system 2 comprises a number of user stations having similar functionalities to each other as well as a plurality of internet access providers, which also have similar functionalities to each other. In this instance, in order to simplify the illustration of FIG. 1, only a user station 10 and an access provider 12 have been illustrated.

The station 10 is capable of browsing on the network 4. To this end, it is formed, for example, by a conventional computer 14 which is provided with a screen and a keyboard and an internet navigator 16 which is more commonly known by the English term "browser".

The system 2 also comprises a number of service provider systems and a plurality of authentication servers. In this instance, only two service provider systems 20, 22, referred to as providers, and two authentication servers 24, 26 are illustrated in FIG. 1 in order to simplify the illustration.

The service providers 20, 22 are intended to provide services to the user of the station 10.

For example, in this instance, the provider 20 is a data server which is capable of establishing payment slips in accordance with the data which are communicated to it by the user of the station 10. To this end, the server 20 comprises a module 32 which is capable of identifying and authenticating the user of the station 10 in order to personalise and secure the service which it provides for this user. More precisely, the provider 20 is associated with a memory 30 in which a list 34 of known authentication servers is stored for the provider 20 and an authentication level 36 required by this provider.

The list 34 comprises authentication server identifiers which contain authentication data capable of identifying and authenticating a user with this service provider. An item of data of this type is, for example, an authentication level which is currently available for a specific user.

The authentication level stored in the memory 30 defines the quality of the authentication required by the provider 20. In the system 2, by way of example, each authentication level may take any one of the whole values between "1" and "5". The lower the value of the authentication level, the lower the quality of the authentication. In this case, by way of example, the authentication level 36 is equal to "2".

The functions carried out by the module 32 are described in greater detail with reference to FIGS. 3 and 4 and the advantage of the list 34 and the authentication level will be appreciated from a reading of the following description. In this instance, it will simply be mentioned that the module 32 is capable of transmitting an HTTP authentication request, which is included in an HTTP response for authenticating the user, to the station 10 of this user.

The provider 22 allows, for example, the user of the station 10 to remotely control his bank accounts and also carry out banking transactions. The provider 22 comprises the same elements as those described with regard to the provider 20 apart from the fact that the authentication level 36 is replaced by an authentication level 38 equal to "4".

The authentication servers 24 and 26 are intended to respond to the authentication requests transmitted by the service providers. To this end, the servers 24 and 26 are each associated with a memory 40, 41 in which an item of authentication data 42, 43 is stored for each known user of this server. Each item of authentication data contains the authentication level available for the corresponding user.

Each authentication server 24, 26 also comprises an access control module 44. This module allows the servers 24 and 26 to transmit an active authentication request in order to interrogate the user of the station 10 so that he provides a set of data which allows him to be identified and authenticated with a desired authentication level. A set of data is, for example, an identifier of the user and his password.

These authentication servers are known by the English term "Identity provider".

The access provider 12 is capable of performing the conventional functions of an internet access provider, that is to say, in particular allocating a network address to the station 10 so that it can browse on the network 4.

To this end, it comprises an HTTP (Hyper Text Transfer Protocol) proxy server and an access control server 52. The existing HTTP protocol is a communication protocol used for data exchanges between HTTP clients and HTTP servers known as web servers. The proxy server is positioned so as to intercept the flow between the station 10 and the network 4, that is to say, all the data flows exchanged between the browser 16 of the station 10 and the network 4 pass via the proxy server 50. In this manner, the proxy server 50 sees all the HTTP requests and responses transmitted by the station 10 or to the station 10.

The access control server 52 is capable of identifying and authenticating the user of the station 10 before authorising this station 10 to connect to the network 4 and browse thereon. Typically, the user of the station 10 is identified to the server 52 by providing a set of data containing an identifier, known by the English term "login", and a password. If the user is correctly identified and authenticated, that is to say that the set of data which he has provided corresponds to a valid subscription with this access provider, the server 52 allocates a network address to this user, that is to say, an IP address (Internet protocol) in this case in order to browse on the network 4. If this is not the case, the server 52 prevents any connection to the network 4.

The server 52 is also capable of recording, in a memory 54 with which it is associated, a list 56 which contains the identifier of the corresponding user for each IP address allocated to a user. This list is updated automatically by the server 52.

The access provider 12 comprises an iCAP server 60 (Internet Content Adaptation Protocol) which is positioned beside the server 50 and which is connected thereto by means of a wire connection 62 or a local network. The existing iCAP protocol is standardised by the organisation IETF (Internet Engineering Task Force) for the systematic conversion of internet content. The server 60 and the server 50 are therefore capable of communicating with each other using the iCAP protocol. More precisely, the server 50 is capable of communicating to the server 60 HTTP requests or responses which are present in the data flows exchanged between the station 10 and the network 4 and the server 60 is also capable of transmitting HTTP responses or requests to the server 50 after having modified them.

In order to implement an iCAP client in the proxy server 50, it is equipped with an ICAP interface 64 which comprises a connector which allows it to be connected to the server 60.

The interface 64 is configured in this instance to transmit to the server 60 only the HTTP requests or responses which have to be modified in order to implement the SSO method.

The server 60 is provided with an SSO module 66 which is capable of undertaking all the specific processing operations required by the implementation of the SSO method. This module 66 comprises three sub-modules 68, 70 and 72 which each correspond to an ICAP service. These sub-modules will be described in greater detail with reference to both FIGS. 3 and 4.

The server 60 is associated with the memory 54 which also contains a list 76 of the known authentication servers for each user. This list 76 includes for each user the identifiers of the various authentication servers in which authentication data are stored for this user.

The server 60 also implements an HTTP client. To this end, it is connected to the network 4 by means of a supplementary HTTP proxy server 74 which can be independent and separate from the proxy server 50.

All of the servers of the system 2 are produced based on conventional programmable electronic computers which are capable of carrying out instructions stored on a data recording support means. To this end, the memories 30, 40, 41 and 54 comprise instructions for carrying out the SSO method of FIGS. 2 to 4 when the instructions are carried out by these computers.

Figure 2:
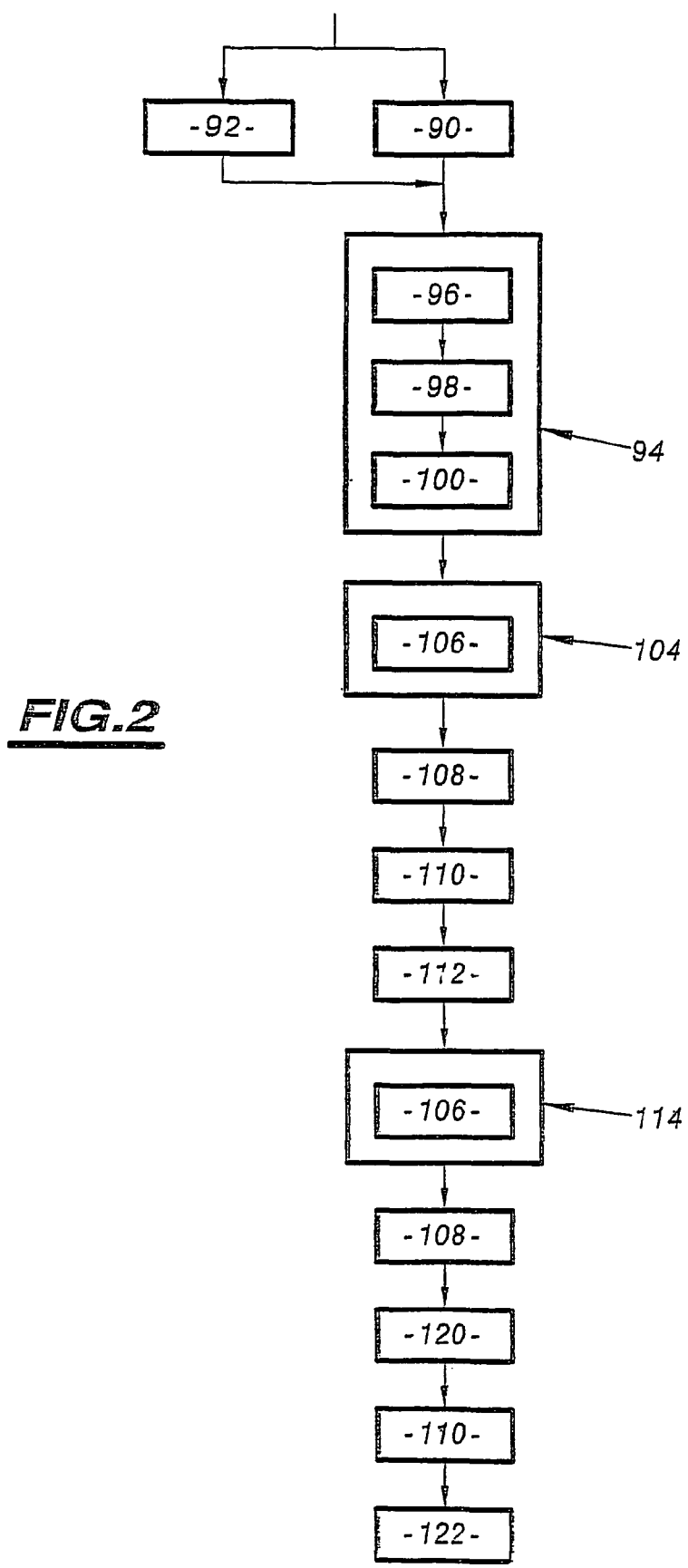
FIG. 2 is a flow chart of a simplified signature method implemented in the system of FIG. 1, and FIGS. 3 and 4 are schematic illustrations of the circulation of data flows between the various items of equipment of the system of FIG. 1.

The operation of the system 2 will now be described with reference to FIGS. 2 to 4.

Initially, during a step 90, an identifier of the server 24 is stored in the list 76 of authentication servers known by the user.

At the same time, during a step 92, the lists 34 of service providers are updated.

Subsequently, the user of the station 10 connects to the network 4 during a step 94. During this step, the user enters, during an operation 96, a set of data which allows him to be identified and authenticated by the server 52.

Once the user 10 has been identified and authenticated, the server 52, during an operation 98, allocates him an IP address and records the relationship between this network address and the identifier of this user in the list 56.

During an operation 100, the server 52 then informs the various authentication servers known by this user that the user has been correctly identified and authenticated. This identification and authentication carried out by the server 52 is in this case associated with an authentication level equal to "2" so that the authentication servers store the fact that the available authentication level is equal to "2".

Once authorised to browse on the network 4, the user connects, for example, during a step 104, to the service provider 20. The module 32 of the provider 20 transmits in response, during an operation 106, an HTTP authentication request included in an HTTP response intended for the station 10. This request is intercepted by the proxy server 50 then processed by the iCAP server 60 and finally transmitted to the authentication server 24. This authentication request comprises the authentication level 36. The server 24 verifies, during a step 108, that the authentication level available for this user is at least equal to "2". In this instance, since the available authentication level is equal to that required by the provider 20, the server 24 transmits, during a step 110, an authentication response which contains a certificate of authentication to the provider 20. This certificate informs the provider 20 that the required authentication level is available.

The provider 20 which has received the certificate proposes, during a step 112, a personalised and/or secure service for this user without the user having to identify himself to the provider 20. For example, the provider 20 proposes to print him a payment slip including his name.

Still during the same connection, the user 10 then connects to the service provider 22 at 114. This provider 22 carries out the operation 106.

However, in contrast to the previous case, the authentication server 24 confirms that the authentication level required by the provider 22 is higher than that which is currently available for this user.

The module 44 for controlling access to the server 24 then carries out an active authentication step 120 during which it interrogates the user in order to identify him and authenticate him with an authentication quality corresponding to the authentication level "4". For example, the module 44 requests that the user enter personal data, such as his date of birth.

If the user of the station 10 has been correctly identified and authenticated with an authentication level "4", the server 24 records the new authentication level available in the memory 40 thereof and carries out step 110.

The provider 22 then proposes, during a step 122, a personalised and/or secure service for this user.

The above method, described in the specific case of the providers 20, 22, is repeated as the user of the station 10 contacts new service providers.

Using this method, the authentication of the user is thus simplified since he has to identify and authenticate himself only during connection to the network 4, then each time he contacts a service provider requiring a level of authentication higher than that available. This method therefore prevents the user from having to enter, each time he contacts a new service provider, a set of identification and authentication data corresponding to this service provider.

The data flows exchanged between the equipment of the system 2 during steps 104 to 122 will now be described in greater detail with reference to FIGS. 3 and 4.

Figure 3:
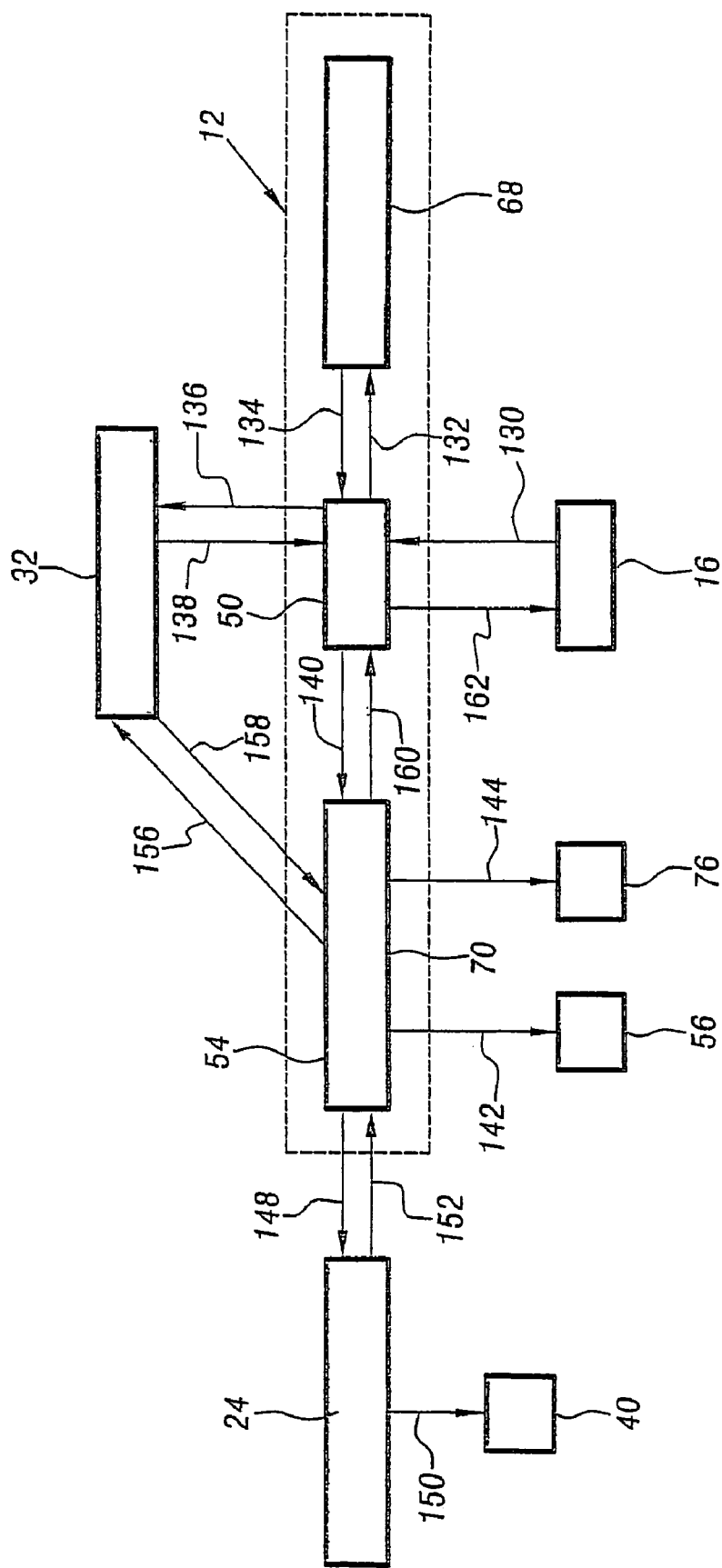
Figure 4:
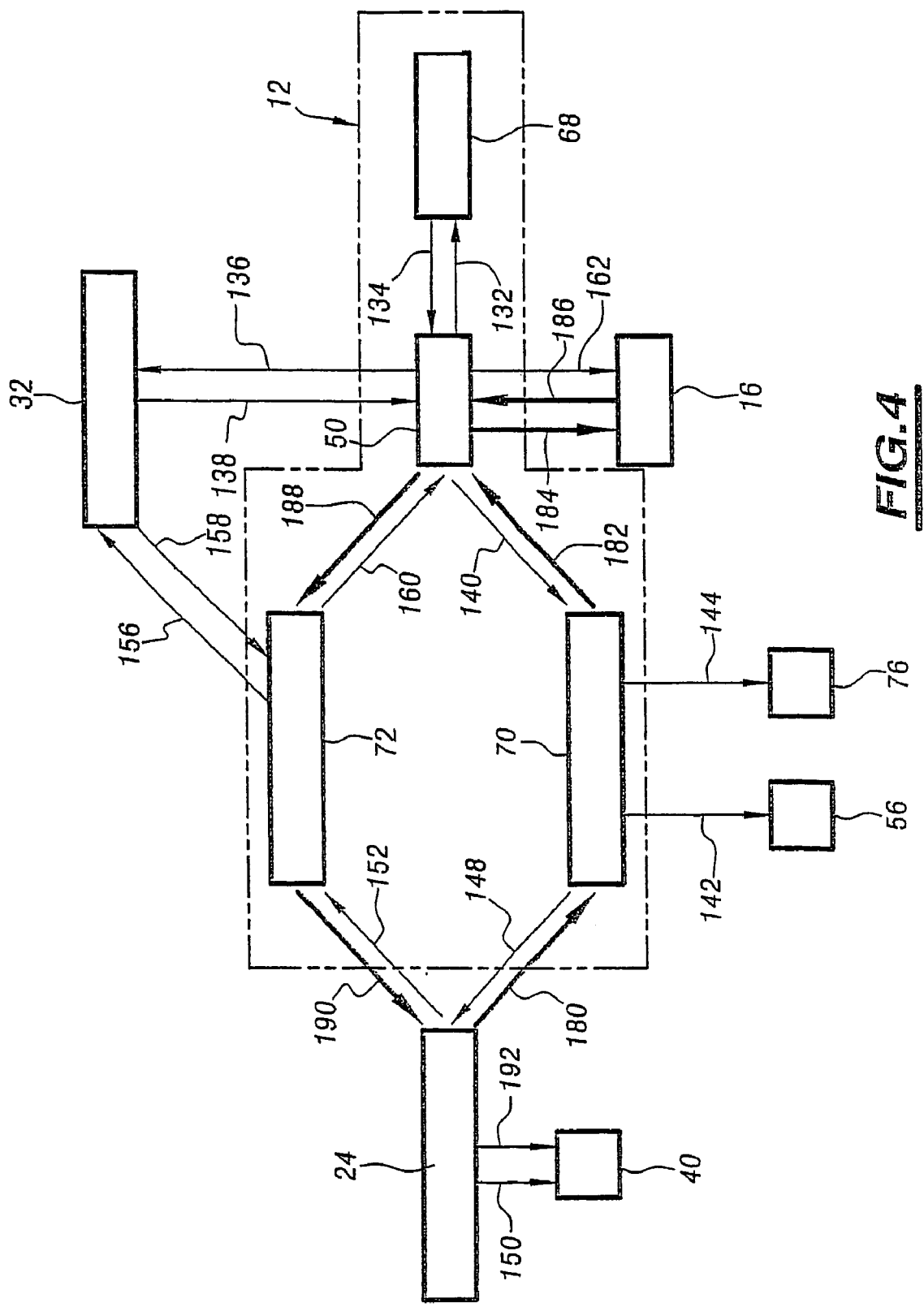

In FIGS. 3 and 4, the rectangular blocks illustrate stored lists or equipment already described with reference to FIG. 1 and therefore have the same references. The arrows between these items of equipment at the same time indicate the direction of the data flow and the corresponding operations.

Initially, the browser 16 of the station 10 sends an HTTP request to the module 32 of a service provider, for example, the provider 20. This request is conveyed to the proxy server 50 during an operation 130. The interface 64 intercepts this request and transmits it, during an operation 132, to the server 60 and more particularly to the sub-module 68. The sub-module 68 adds a header to the HTTP request indicating that the system 2 supports an SSO method and transmits, during an operation 134, this HTTP request which has been modified in this manner to the proxy server 50.

The proxy server transmits the modified HTTP request to the service provider during an operation 136.

The module 32 of the service provider detects the presence of the header added by the sub-module 68 and, in response, sends an authentication request to the browser 16 during an operation 138.

The authentication request is, for example, in accordance with the SOAP protocol (Single Object Access Protocol) which is standardised by the organisation W3C (Word Wide Web Consortium).

This authentication request in particular comprises a service provider identifier, a copy of the list 34 of known authentication servers, the authentication level required by this provider and, for example, an instruction known by the English term "set cookie" which is intended to record an identifier of the authentication request on the station 10 or, in a variant, directly an identifier of the request.

The interface 64 of the proxy server 50 intercepts this authentication request and directs it to the sub-module 70 of the server 60 during an operation 140.

During an operation 142, the sub-module 70 compares the list 34 received with the list 56 in order to select the authentication server to be contacted, for example, the server 24 in this instance. If there is no authentication server common to the list 34 received and the list 56, the sub-module 70 sends a message of incompatibility to the service provider who transmitted the authentication request. This message of incompatibility comprises the identifier of the authentication request so that the module 32 can link this response to the corresponding authentication request. The identifier of the authentication request is, for example, that contained in the instruction "set cookie".

Finally, during an operation 144, the sub-module 70 determines the identity of the user of the station 10 by comparing the network address of the station 10 with the list 76. This address will have been provided to the sub-module 70 by the proxy server 50 during the operation 140 by means of a field of the HTTP header.

After the user has been identified, the sub-module 70 carries out an operation 148 for transmitting the authentication request received, associated with the user identifier obtained during the operation 144, to the authentication server selected during the operation 142.

During an operation 150, the server 24 compares the authentication level available for the user with that required by the service provider.

If the authentication level required is higher than that currently recorded by the server 24, it proceeds as described with reference to FIG. 4.

Otherwise, the server 24 sends an authentication response to the server 60 during an operation 152.

The sub-module 70 receives the authentication response and transmits it, during an operation 156, to the service provider via the proxy server 74, using the HTTP protocol. This authentication response comprises an identifier of the user, if necessary.

The service provider responds to this authentication response by transmitting to the server 60, during an operation 158, for example, a personalised home page. This response is transmitted to the server 60 via the proxy server 74 using the HTTP protocol.

During an operation 160, the sub-module 70 redirects this response to the proxy server 50 using the iCAP protocol which in turn redirects it, during an operation 162, to the browser 16 using the HTTP protocol.

A personalised home page is thus displayed on the browser 16 of the user of the station 10 without this user even having had to identify himself, for example, to the provider 20.

FIG. 4 illustrates the flow of data between the various items of equipment of the system 2 for the specific case in which the authentication level required by the service provider contacted is higher than that which is currently stored in the memory 40 of the server 24. In this Figure, the items of equipment and the operations already described with reference to FIGS. 1 and 3 have the same references and the new operations are illustrated with bold lines.

During the operation 150, the server 24 has established that the authentication level required is higher than that currently available for the user. Consequently, it carries out an operation 180 during which the module 44 transmits to the server 60 an active authentication request contained in an HTTP response using the HTTP protocol. The active authentication request is intended to activate an interactive authentication process on the browser 16. To this end, this request comprises in this instance a form to be completed by the user.

During an operation 182, the sub-module 70 transmits this active authentication request to the proxy server 50 using the iCAP protocol, then the proxy server 50 transmits it to the browser 16 using the HTTP protocol during an operation 184. The browser 16 displays the form which allows the user to identify and authenticate himself with a higher level of authentication, for example, equal to "4" in the case of the service provider 22. After the form has been completed, the browser 16 sends the response in an HTTP request during an operation 186. This response is intercepted by the interface 64 of the server 50 and is transmitted to the sub-module 72 using the iCAP protocol during an operation 188. During an operation 190, the sub-module 72 transmits the response of the user to the server 24 using the HTTP protocol. If the form has been correctly completed by the user, that is to say, the set of identification and authentication data is correct, during an operation 192, the server 24 stores the new authentication level available in the memory 40 and then carries out the operation 152. The following operations are identical to those described with reference to FIG. 2 apart from the fact that the operations 152, 156, 158 and 160 bring about the intervention of the sub-module 72 in place of the sub-module 70.

The majority of existing proxy servers already comprise an iCAP interface. The system of FIG. 2 thus simplifies the implementation of the SSO method since the only modification to be carried out to the proxy server consists in configuring it so that the iCAP interface intercepts the HTTP requests required to implement this method.

The circulation of data flows between the various elements of the system 2 has been described for the specific case in which the ICAP server 60 communicates directly with the service provider(s) using the HTTP protocol during operations 156 and 158. In a variant, the iCAP server communicates with the service providers only by means of the iCAP protocol. For example, in this variant, the HTTP requests ultimately transmitted to the service provider during the operation 156 are first transmitted to the proxy server 50 by the server 60 using the iCAP protocol then the proxy server 50 transmits these requests to the service provider using the HTTP protocol. The HTTP response transmitted by the service provider during the operation 158 follows the reverse path of the request transmitted during the operation 156. In this variant, the server 60 never communicates directly with the service providers so that they are not aware of the existence of the server 60. The use of the server 60 is completely transparent for these service providers. This variant has the advantage that, with regard to the service provider, all the exchanges of data are carried out between the service provider and the user without any knowledge of the existence of the server 60. This variant also has the advantage that the HTTP requests transmitted and received during the operations 156 and 158 are directly exchanged with the proxy server 50 and no longer via the sub-module 70, which accelerates the processing of these operations.

The sub-modules 68 to 72 have been described for the specific case in which they are all implemented in the same iCAP server 60. In a variant, these sub-modules are each implemented in an iCAP server which is independent from the others.

In this instance, the interface 64 is configured to intercept only the HTTP requests which must be processed by the iCAP server. In a variant, the interface 64 is configured to redirect all the HTTP data flows to the iCAP server and the ICAP server implements a filtering module which is capable of sending to the processing module 66 only the HTTP requests which must be processed by this module. In this variant, the interception of the HTTP requests is thus carried out not by the proxy server 50, but instead by the ICAP server.

The system 2 has been illustrated for the specific case in which the authentication servers are connected to the internet access provider by means of the network 4. In a variant, at least one of these authentication servers is located at the premises of the internet access provider and connected thereto by means of a local network which is independent from the network 4. This advantageous application method will allow it to benefit from all the identification/authentication operations which are carried out by the access provider and which could not be shared with external authentication providers for security reasons.

In the same manner, in a variant, the iCAP server is connected to the proxy server 50 by means of a long distance network and no longer by means of a local network or connection.

The system 2 has been described for the specific case in which the first authentication of each user is carried out by the internet access provider 12. In a variant, this first authentication is no longer carried out by the internet access provider 12, but instead, for example, by the first service provider contacted by the user.

The identification and authentication of the user have been described for the specific case in which it is carried out from a terminal 10 which is provided with a screen and a keyboard, which allows a set of identification and authentication data to be input. In a variant, the first identification and authentication of the user is carried out automatically, for example, by identifying the terminal used by this user. More precisely, when the terminal 10 is replaced with a mobile telephone, the identification and authentication of the user are carried out automatically by carrying out the acquisition of the telephone number of the terminal. In this case, the authentication is said to be transparent.

The system 2 has also been described for the specific case in which the authentication servers store only the authentication level available for each user, which improves the security of the system since it is not desirable for all the passwords and other secret data of the user to be recorded in the same location. In a variant, however, these authentication servers also store, as authentication data, the set(s) of identification and authentication data which each user is capable of using to identify and authenticate himself with each service provider. In this variant, the authentication response thus comprises the set of identification and authentication data to be transmitted to the service provider so that the service provider identifies and authenticates the user. This set of identification and authentication data is transmitted to the service provider in a similar manner to that described for the authentication certificate.

The system 2 has been described for the specific case in which the authentication request transmitted by each service provider comprises an authentication level. In a variant, the authentication request transmitted by one of the service providers does not comprise an authentication level. In this variant, in response to this authentication request, the authentication server contacted provides, in response, an authentication certificate indicating simply that the user has been authenticated. In this variant, the user will thus have access to the services of the service provider from the time he has been authenticated at least once, whatever the level of this authentication.

The system 2 has been described for the specific case in which the network 4 is the internet network. In a variant, however, this network 4 is a data transmission network of any type, such as a local network, a packet switching network of any type or a circuit switching network.

The system 2 has been described for the specific case in which the authentication servers are capable of transmitting active authentication requests when they do not have a satisfactory level of authentication for the user. In a variant, the authentication servers are not capable of transmitting these active authentication requests. Consequently, in this variant, when an authentication server is contacted and it does not have, for example, any authentication data relating to the user, it is capable of transmitting an error message in place of an active authentication request.

Finally, the system 2 has been described for the specific case in which the HTTP data transfer protocol is the iCAP protocol. In a variant, the ICAP protocol can be replaced with any other HTTP data transfer protocol, such as, for example, the OCP protocol (OPES Call Out Protocol) with OPES (Open Pluggable Edge Services).

The system 2 has been defined with reference to the recommendations established by Liberty Alliance. However, the invention claimed is not limited to the systems and methods in accordance with the recommendations of Liberty Alliance and can be used for any system or method which has similar functionalities to those described above.

The invention claimed is:

1. A system for access to a packet switching network suitable for implementing a simplified signature method, the system comprising:
   a proxy server through which all data flows pass which are exchanged between a user and the network,
   a plurality of service providers which are connected to the network, each service provider being capable of transmitting, through the network, an authentication request to the user who contacts the service provider, through the network, in order to identify and/or authenticate the user before providing him with personalized and/or secure services, the response to be provided by same user to the authentication request being able to be different in accordance with the service provider contacted,
   at least one authentication server which is capable of storing at least one item of authentication data for each user and transmitting, in response to an authentication request, an authentication response which contains an item of authentication data in accordance with both the service provider who transmitted the authentication request and identity of the user who contacted the service provider, and
   a simplified signature module which is capable of automatically processing on behalf of the user the authentication requests transmitted by the service providers contacted, the module being capable for each user:

of directing the authentication requests to the appropriate authentication server, and of transmitting to the service provider the corresponding authentication response transmitted by the appropriate authentication server, wherein the system further comprises a supplementary server which is independent from the proxy server, the simplified signature module being implemented in the supplementary server, and wherein the proxy server is provided with an interface which allows the proxy server to be connected to the supplementary server and allows at least the authentication requests transmitted by the service providers contacted to be transmitted to the supplementary server in order to process these requests using the simplified signature module.

2. The system according to claim 1, wherein the simplified signature module comprises a sub-module which is capable of identifying the user from his network address and adding an identifier of the user to the authentication requests directed to the authentication servers.

3. The system according to claim 1, wherein the at least one item of authentication data stored for each user comprises an item of data relating to a level of authentication available for the user, wherein each authentication request transmitted by a service provider specifies features relating to the authentication level required by the service provider in order to be able to access the services the service provider provides, wherein the or each authentication server is capable of comparing the features relating to the required authentication level specified by the authentication request with the data relating to the authentication level available in order to determine whether the authentication level required corresponds to the authentication level available for the user, and wherein the or each authentication server is capable of transmitting to the user an active authentication request which is capable of activating an interactive process for identification and/or authentication of the user if the authentication level required does not correspond to the authentication level available.

4. The system according to claim 3, wherein the supplementary server comprises a sub-module which is capable of directing the response of the user to the active authentication requests to the authentication server which has transmitted the active authentication requests.

5. The system according to claim 3, wherein the supplementary server comprises a sub-module which is capable of directing the active authentication request to the user.

6. The system according to claim 1, wherein the simplified signature module comprises a sub-module which is capable of adding, to the requests transmitted by the user to a service provider, an identification signal of a simplified signature service, in response to which the service provider transmits the authentication request.

7. The system according to claim 1, wherein the supplementary server and the proxy server are capable of communicating with each other using a Hyper Text Transfer Protocol (HTTP).

8. The system according to claim 7, wherein the Hyper Text Transfer Protocol is the iCAP protocol (Internet Content Adaptation Protocol) or the OCP protocol (OPES Call Out Protocol).

9. The system according to claim 7, wherein the supplementary server is capable of communicating with the service providers only by means of the Hyper Text Transfer Protocol used between the supplementary server and the proxy server.

10. The system according to claim 1, wherein the supplementary server also implements an HTTP (Hyper Text Transfer Protocol) server and/or client in order to communicate directly with the or each service provider and/or the or each authentication server using only the HTTP protocol.

11. The system according to claim 1, wherein the system further comprises a provider of access to the network to which the user must be connected in order to be able to access the network, the access provider being provided with the proxy server.

12. The system according to claim 1, wherein the network is the World Wide Web.

13. A server for use in a system according to claim 1 as the supplementary server, wherein the supplementary server comprises the simplified signature module which is capable of automatically processing on behalf of the user the authentication requests transmitted by the or each service provider contacted, and is capable of communicating with a proxy server in order to receive at least the authentication requests transmitted by the service providers.

* * * * *